(12) United States Patent
Lu et al.

(10) Patent No.: US 9,775,166 B2
(45) Date of Patent: Sep. 26, 2017

(54) METHOD, DEVICE, AND SYSTEM FOR CONTROLLING QUALITY OF SERVICE

(71) Applicant: Huawei Technologies Co., Ltd., Shenzhen, Guangdong (CN)

(72) Inventors: Liming Lu, Shanghai (CN); Leibin Zheng, Shenzhen (CN); Yufang Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 14/335,410

(22) Filed: Jul. 18, 2014

(65) Prior Publication Data

US 2014/0328288 A1    Nov. 6, 2014

Related U.S. Application Data

(63) Continuation of application No. PCT/CN2012/070672, filed on Jan. 20, 2012.

(51) Int. Cl.
*H04W 72/08*    (2009.01)
*H04W 28/02*    (2009.01)
(Continued)

(52) U.S. Cl.
CPC ....... *H04W 72/087* (2013.01); *H04L 47/2441* (2013.01); *H04W 28/0268* (2013.01);
(Continued)

(58) Field of Classification Search
None
See application file for complete search history.

(56) References Cited

U.S. PATENT DOCUMENTS

2008/0123660 A1    5/2008  Sammour et al.
2008/0229385 A1*   9/2008  Feder .................. H04L 12/14
                                                           726/1
(Continued)

FOREIGN PATENT DOCUMENTS

CN    101009631 A    8/2007
CN    101272256 A    9/2008
(Continued)

OTHER PUBLICATIONS

"End to end aspects of LTE/SAE", Qualcomm Europe, Samsung, 3GPP SA2 Meeting #56, Jan. 15-19, 2006, 5 pages.
(Continued)

*Primary Examiner* — Jenee Williams

(57) ABSTRACT

A method, a device, and a system for controlling quality of service are provided. The method includes: obtaining, by a policy and charging enforcement function PCEF entity, a service flow priority identifier (FPI) of a downlink data packet, where the FPI is used to indicate a priority of a service flow to which the downlink data packet belongs; carrying, by the PCEF, the FPI in the downlink data packet; and sending, by the PCEF, the downlink data packet to a base station, so that the base station sends the downlink data packet to a user equipment UE according to the FPI. By adopting the method, the device, and the system according to the embodiments of the present invention, end-to-end differentiated processing of a service flow can be implemented, differentiated experiences can be provided for different levels of subscribers and different types of services.

14 Claims, 5 Drawing Sheets

(51) Int. Cl.
*H04L 12/851* (2013.01)
*H04W 72/04* (2009.01)
*H04W 72/12* (2009.01)
*H04L 12/24* (2006.01)
*H04L 12/26* (2006.01)

(52) U.S. Cl.
CPC ..... *H04W 72/042* (2013.01); *H04W 72/1242* (2013.01); *H04L 41/0893* (2013.01); *H04L 43/026* (2013.01); *H04W 72/1273* (2013.01)

(56) References Cited

U.S. PATENT DOCUMENTS

| | | | | |
|---|---|---|---|---|
| 2008/0232376 | A1* | 9/2008 | Huang | H04W 4/20 370/395.3 |
| 2008/0253368 | A1* | 10/2008 | Rasanen | H04L 65/607 370/389 |
| 2009/0092078 | A1* | 4/2009 | Czaja | H04L 41/0806 370/328 |
| 2009/0197588 | A1* | 8/2009 | Khandekar | H04W 72/082 455/422.1 |
| 2009/0254494 | A1* | 10/2009 | Li | G06Q 30/0283 705/400 |
| 2009/0298475 | A1* | 12/2009 | Czaja | H04W 48/04 455/412.2 |
| 2010/0017846 | A1* | 1/2010 | Huang | H04L 12/14 726/1 |
| 2010/0039941 | A1* | 2/2010 | Tan | H04L 12/14 370/241 |
| 2010/0043053 | A1* | 2/2010 | Wei | H04L 47/10 726/1 |
| 2010/0131647 | A1* | 5/2010 | Fernandez Alonso | H04L 63/102 709/225 |
| 2010/0223222 | A1* | 9/2010 | Zhou | H04L 12/14 706/47 |
| 2010/0235877 | A1* | 9/2010 | Hu | H04L 63/0227 726/1 |
| 2011/0021198 | A1* | 1/2011 | Breau | H04W 36/0055 455/437 |
| 2011/0122885 | A1* | 5/2011 | Hedman | H04L 65/1016 370/412 |
| 2011/0320580 | A1* | 12/2011 | Zhou | H04L 12/14 709/223 |
| 2012/0042059 | A1* | 2/2012 | Tian | H04L 67/322 709/223 |
| 2012/0051235 | A1* | 3/2012 | Kotecha | H04W 76/007 370/252 |
| 2012/0059943 | A1* | 3/2012 | Castro Castro | H04L 12/14 709/227 |
| 2012/0059944 | A1* | 3/2012 | Fernandez Alonso | H04L 12/1457 709/228 |
| 2012/0063402 | A1* | 3/2012 | Arvidsson | H04W 72/1242 370/329 |
| 2012/0213072 | A1* | 8/2012 | Kotecha | H04W 28/0268 370/235 |
| 2012/0284189 | A1* | 11/2012 | Gardella | H04L 12/14 705/44 |
| 2012/0307687 | A1* | 12/2012 | Zhang | H04W 4/22 370/259 |
| 2013/0084881 | A1 | 4/2013 | Tang | |
| 2013/0188554 | A1* | 7/2013 | Cai | H04M 15/65 370/328 |
| 2014/0317300 | A1* | 10/2014 | Ludwig | H04W 76/064 709/226 |

FOREIGN PATENT DOCUMENTS

| | | |
|---|---|---|
| CN | 101841456 A | 9/2010 |
| RU | 2406273 C2 | 12/2010 |
| WO | 2008/069094 A1 | 6/2008 |
| WO | WO 2011/020208 A1 | 2/2011 |
| WO | WO 2011/144143 A1 | 11/2011 |

OTHER PUBLICATIONS

"PCC support for service priority", Ericsson, 3GPP TSG-SA WG2 Meeting S2#57, Apr. 23-27, 2007, 7 pages.

"PCC Principles for EPS", Qualcomm Europe, KDDI, Camiant, 3GPP TSG SA WG2 Architecture—S2#59, Aug. 27-31, 2007, 9 pages.

QoS management, Nortel, 3GPP TSG SA WG2 Architecture—S2#49, Nov. 7-11, 2005, 5 pages.

"3rd Generation Partnership Project; Technical Specification Group Services and System Aspects; Architecture enhancements for non-3GPP accesses (Release 11)", 3GPP TS 23.402 v11.1.0, Dec. 2011, 232 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 11)", 3GPP TS 23.401 v11.0.0, Dec. 2011, 287 pages.

"3rd Generation Partnership Project; Technical Specification Group Services and System Aspects; Policy and charging control architecture (Release 11)", 3GPP TS 23.203 v11.4.0, Dec. 2011, 167 pages.

"3rd Generation Partnership Project; Technical Specification Group Services and System Aspects; General Packet Radio Service (GPRS); Service description; Stage 2 (Release 11)", 3GPP TS 23.060 v11.1.0, Dec. 2011, 300 pages.

"3rd Generation Partnership Project; Technical Specification Group Services and System Aspects; Quality of Service (QoS) concept and architecture (Release 10)", 3GPP TS 23.107 v10.2.0, Dec. 2011, 42 pages.

\* cited by examiner

METHOD, DEVICE, AND SYSTEM FOR CONTROLLING QUALITY OF SERVICE

CROSS-REFERENCE TO RELATED APPLICATIONS

This application is a continuation of International Application No. PCT/CN2012/070672, filed on Jan. 20, 2012, which is hereby incorporated by reference in its entirety.

TECHNICAL FIELD

The present invention relates to the field of communication technologies, and in particular, to a method, a device, and a system for controlling quality of service.

BACKGROUND

With the rapid popularization of intelligent mobile terminals and the development of the mobile Internet, higher requirements and technical challenges are imposed on a network of an operator, which mainly involve aspects such as bandwidth on demand, assurance of quality of service, and service experience improvement. In this case, it is required that the network of the operator needs to have a service differentiation capability. That is, the network of the operator may differentiate priorities according to subscribers and service demands, treat the subscribers and the service demands in a differentiated manner, and provide the subscribers with services that match subscription of the subscribers.

A quality of service (Quality of Service, QoS) technology is a main means to implement the service differentiation capability of the network currently, and in the field of mobile communication, a QoS model defined by the 3rd Generation Partnership Project (3rd Generation Partnership Project, 3GPP) organization is mainly adopted. However, a solution based on the model is limited to a certain extent in actual deployment, and cannot fully meet a requirement of an operator for deploying a QoS differentiated service.

For services within a same bearer, a radio access network node cannot differentiate priorities of the services. As a result, a service with a high priority cannot be forwarded preferentially, disordered packet loss occurs when an air interface is overloaded, and end-to-end differentiated processing of a service flow, namely, differentiated processing of a service flow from a service end to a user equipment end, cannot be implemented, so that differentiated experiences cannot be provided for different levels of subscribers and different types of services.

SUMMARY

In view of this, embodiments of the present invention provide a method, a device, and a system for controlling quality of service, which can implement end-to-end differentiated processing of a service flow, provide differentiated experiences for different levels of subscribers and different types of services, and improve utilization efficiency of radio resources.

To solve the foregoing problems, the embodiments of the present invention provide the following technical solutions:

In one aspect, an embodiment of the present invention provides a method for controlling quality of service, where the method includes:

obtaining, by a policy and charging enforcement function PCEF entity, a service flow priority identifier FPI of a downlink data packet, where the FPI is used to indicate a priority of a service flow to which the downlink data packet belongs;

carrying, by the PCEF, the FPI in the downlink data packet; and sending, by the PCEF, the downlink data packet to a base station, so that the base station sends the downlink data packet to a user equipment UE according to the FPI.

In another aspect, an embodiment of the present invention provides another method for controlling quality of service, where the method includes:

receiving, by a base station, a downlink data packet, where the downlink data packet includes a service flow priority identifier FPI, and the FPI is used to indicate a priority of a service flow to which the downlink data packet belongs; and sending, by the base station, the downlink data packet to a user equipment UE according to the FPI.

In still another aspect, an embodiment of the present invention provides a policy and charging enforcement function entity, including: an obtaining unit, a marking unit, and a sending unit, where the obtaining unit is configured to obtain a service flow priority identifier FPI of a downlink data packet, where the FPI is used to indicate a priority of a service flow to which the downlink data packet belongs;

the marking unit is configured to carry the FPI in the downlink data packet; and the sending unit is configured to send the downlink data packet to a base station, so that the base station sends the downlink data packet to a user equipment UE according to weight information corresponding to the FPI.

In yet another aspect, an embodiment of the present invention provides a policy and charging rules function entity, including:

an obtaining unit, configured to obtain a service flow priority identifier FPI according to a service type of a service to which a downlink data packet belongs and at least one of the following items: a service priority of the service to which the downlink data packet belongs, a subscriber accumulated usage level of the service to which the downlink data packet belongs, a subscriber level of the service to which the downlink data packet belongs, and a type of a UE receiving the downlink data packet, where the FPI is used to indicate a priority of a service flow to which the downlink data packet belongs; and a sending unit, configured to send the FPI to a policy and charging enforcement function entity.

In yet another aspect, an embodiment of the present invention provides a base station, including a receiving unit and a sending unit, where the receiving unit is configured to receive a downlink data packet, where the downlink data packet includes a service flow priority identifier FPI, and the FPI is used to indicate a priority of a service flow to which the downlink data packet belongs; and the sending unit is configured to send the downlink data packet to a user equipment UE according to the FPI.

In yet another aspect, an embodiment of the present invention provides a system for controlling quality of service, where the system includes the policy and charging enforcement function entity and the base station.

By adopting the method, the device, and the system according to the embodiments of the present invention, a priority of a service flow is indicated by using a one-dimensional scalar FPI, and sending of a downlink data packet of the service flow is performed according to the FPI through a base station; in this way, end-to-end control of quality of service based on service flow granularity is implemented, end-to-end differentiated processing can be performed on the service flow, differentiated service experiences can be provided for different levels of subscribers and different types of services, and utilization efficiency of radio resources can be effectively improved.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description are merely some embodiments of the present invention, and a person of ordinary skill in the art may further obtain other drawings according to these accompanying drawings without creative efforts.

DETAILED DESCRIPTION

Figure 1:
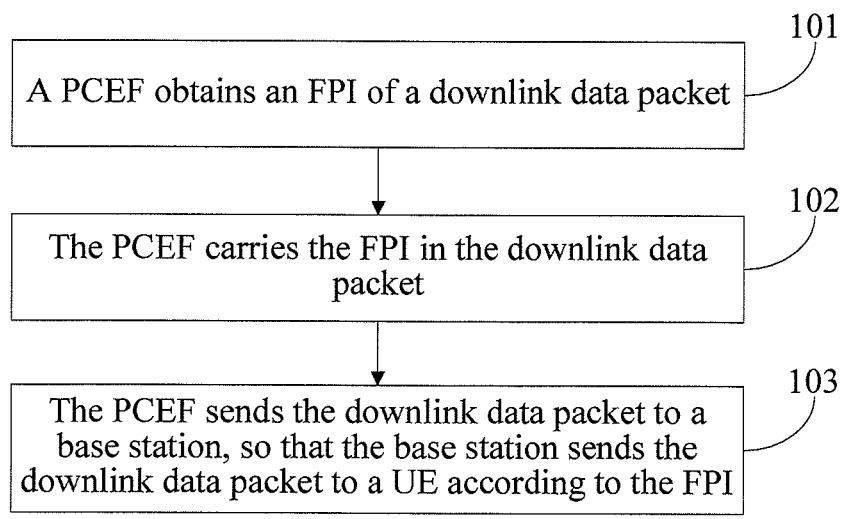
FIG. 1 is a schematic flowchart of a method for controlling quality of service according to an embodiment of the present invention.

The following clearly describes the technical solutions in the embodiments of the present invention with reference to the accompanying drawings in the embodiments of the present invention. Obviously, the embodiments to be described are merely part rather than all of the embodiments of the present invention. All other embodiments obtained by a person of ordinary skill in the art based on the embodiments of the present invention without creative efforts shall fall within the protection scope of the present invention.

In the embodiments of the present invention, a service refers to a data service based on a radio network bearer. Exemplarily, the service may be web page browsing, a video service, a voice service, an online game, file downloading, or the like.

In the embodiments of the present invention, a service flow refers to a data flow generated in a process of performing a service. In a same service, there may be different service flows for different subscribers, and there may also be different service flows when a same subscriber uses different services. The service flow is formed by data packets, and the data packets maybe classified into an uplink data packet and a downlink data packet.

In the embodiments of the present invention, a service flow priority identifier (service Flow Priority Identifier, FPI) is a one-dimensional scalar for indicating a priority of a service flow.

In the embodiments of the present invention, a policy and charging enforcement function (Policy and Charging Enforcement Function, PCEF) entity may be a data gateway or an external processing device. The data gateway may be a packet data network gateway (Packet Data Network Gateway, PGW), and may also be a gateway GPRS support node (Gateway GPRS Support Node, GGSN); and the external processing device may generally be a device having capabilities of deep packet inspection (Deep packet inspection, DPI) and obtaining and executing a policy and charging control (Policy and Charging Control, PCC) policy.

In the embodiments of the present invention, a policy and charging rules function (Policy and Charging Rule Function, PCRF) entity has a capability of generating a PCC rule.

In the embodiments of the present invention, a base station is a broad concept. The base station may be a radio network controller (Radio Network Controller, RNC), a base station controller (Base Station Controller, BSC), or an evolved Node B (evolved Node B, eNodeB).

In the embodiments of the present invention, UEs may be distributed in an entire radio network, and each UE may be static or mobile. The UE may be referred to as a terminal (terminal), a mobile station (mobile station), a subscriber unit (subscriber unit), a station (station), or the like. The UE may also be a cellular phone (cellular phone), a personal digital assistant (personal digital assistant, PDA), a wireless modem (modem), a wireless communication device, a handheld (handheld) device, a laptop computer (laptop computer), a cordless phone (cordless phone), a wireless local loop (wireless local loop, WLL) station, or the like.

In the embodiments of the present invention, an intermediate node refers to a node that a service flow passes through and is located between a base station and a PCEF. Exemplarily, the intermediate node may be a serving gateway (Serving Gateway, SGW) or a serving GPRS support node (Serving GPRS Support Node, SGSN).

An embodiment of the present invention provides a method for controlling quality of service. As shown in FIG. 1, the method includes:

101: A PCEF obtains an FPI of a downlink data packet.

Exemplarily, the PCEF may obtain the FPI, that is, obtain the FPI of the downlink data packet, according to a service type of a service to which the downlink data packet belongs and at least one of the following parameters that may be used for quality control: a service priority of the service to which the downlink data packet belongs, a subscriber accumulated usage level of the service to which the downlink data packet belongs, a subscriber level of the service to which the downlink data packet belongs, and a type of a UE receiving the downlink data packet.

Exemplarily, the PCEF may obtain the FPI of the downlink data packet by receiving the FPI of the downlink data packet from a PCRF. The FPI sent by the PCRF is obtained by the PCRF according to a service type of a service to which the downlink data packet belongs and at least one of the following parameters that may be used for quality control: a service priority of the service to which the downlink data packet belongs, a subscriber accumulated usage level of the service to which the downlink data packet belongs, a subscriber level of the service to which the downlink data packet belongs, and a type of a UE receiving the downlink data packet.

102: The PCEF carries the FPI in the downlink data packet.

Exemplarily, the PCEF may carry the FPI in a tunnel encapsulation header of the downlink data packet.

Exemplarily, the PCEF may carry the FPI in an IP packet header of the downlink data packet.

103: The PCEF sends the downlink data packet to a base station, so that the base station sends the downlink data packet to a UE according to the FPI.

Optionally, during a process in which the PCEF sends the data packet to the UE, an intermediate node receiving the data packet may also send, according to the FPI, the downlink data packet to the UE, that is, during the process in which the PCEF sends the data packet to the UE, the intermediate node also participates in control of quality of service.

In the method for controlling quality of service provided in this embodiment, a priority of a service flow is indicated by using a one-dimensional scalar FPI, and a downlink data packet carrying the FPI is sent to a base station, so that the base station sends the downlink data packet of the service flow according to the FPI; in this way, end-to-end control of quality of service based on service flow granularity is implemented, end-to-end differentiated processing can be performed on the service flow, differentiated service experiences can be provided for different levels of subscribers and different types of services, and utilization efficiency of radio resources can be effectively improved.

Figure 2:
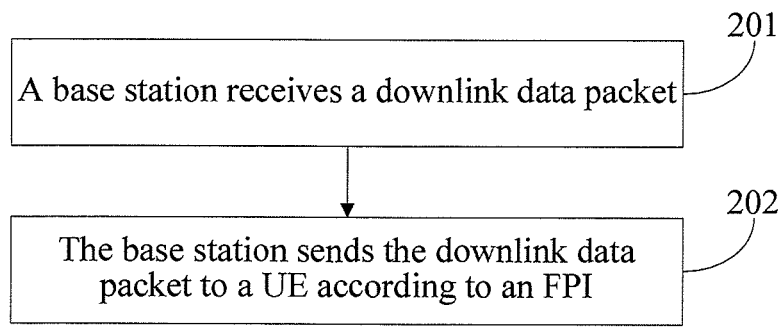
FIG. 2 is a schematic flowchart of another method for controlling quality of service according to an embodiment of the present invention.

Based on a same idea, another embodiment of the present invention also provides a method for controlling quality of service. As shown in FIG. 2, the method includes:

201: A base station receives a downlink data packet.

The downlink data packet includes an FPI.

Exemplarily, the downlink data packet may be obtained according to a service type of a service to which the downlink data packet belongs and at least one of the following parameters that may be used for quality control: a service priority of the service to which the downlink data packet belongs, a subscriber accumulated usage level of the service to which the downlink data packet belongs, a subscriber level of the service to which the downlink data packet belongs, and a type of a UE receiving the downlink data packet.

202: The base station sends the downlink data packet to a UE according to the FPI.

Exemplarily, the base station may send the downlink data packet to the UE according to a sequence of service flow priorities indicated by FPIs.

Exemplarily, the base station may send the downlink data packet to the UE according to weight information corresponding to the FPI.

Exemplarily, the base station may send the downlink data packet to the UE according to weight information corresponding to the FPI and weight information corresponding to a bearer to which the downlink data packet belongs.

In the method for controlling quality of service provided in this embodiment, a priority of a service flow is indicated by using a one-dimensional scalar FPI, and sending of a downlink data packet of the service flow is performed according to the FPI through a base station; in this way, end-to-end control of quality of service based on service flow granularity is implemented, end-to-end differentiated processing can be performed on the service flow, differentiated service experiences can be provided for different levels of subscribers and different types of services, and utilization efficiency of radio resources can be effectively improved.

Figure 3:
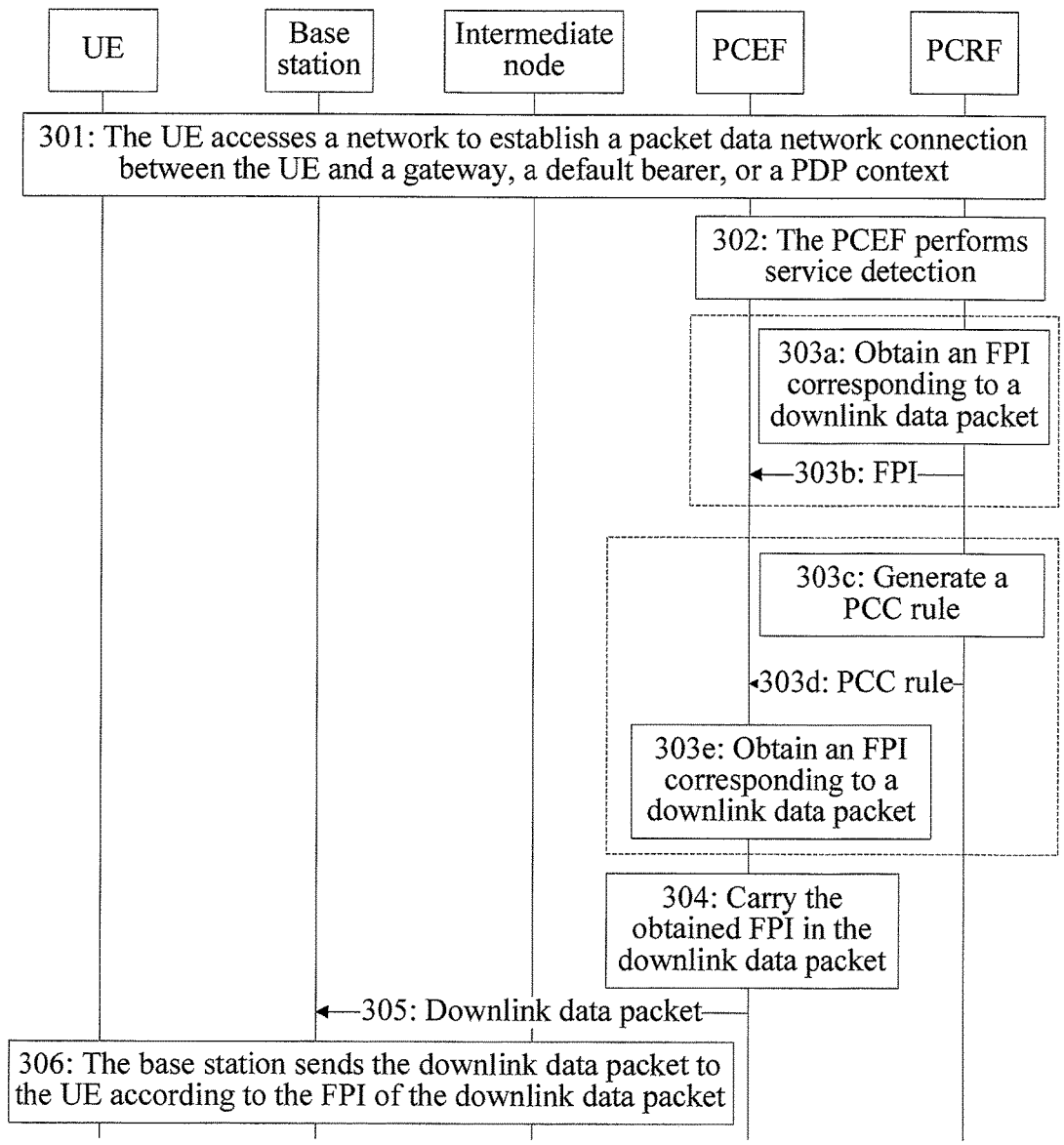
FIG. 3 is a schematic flowchart of still another method for controlling quality of service according to an embodiment of the present invention.

The method for controlling quality of service provided in the embodiment of the present invention is described in detail in the following through a specific example, as shown in FIG. 3.

301: A UE accesses a network to establish a packet data network connection between the UE and a gateway, and a default bearer or a packet data protocol (Packet Data Protocol, PDP) context.

302: A PCEF performs service detection.

When there is a downlink data packet passing, the PCEF performs service detection based on technologies such as IP quintuple or deep packet inspection (Deep packet inspection, DPI). When the PCEF has detected a new service, the PCEF reports a detection result to a PCRF. Exemplarily, the PCEF may report the detection result to the PCRF by adopting a traffic detection function (Traffic Detection Function, TDF) mechanism and a Gx/Sd interface, for example, service information that has been detected may be carried in an Application-Detection-Information information element in a CC-Request message.

Obtaining an FPI of the downlink data packet by the PCEF may be shown in 303a to 303b, and may also be shown in 303c to 303e.

303a: The PCRF obtains an FPI corresponding to the downlink data packet.

Exemplarily, the PCRF may obtain the corresponding FPI according to a service type of a service to which the downlink data packet belongs and at least one of the following items: a service priority of the service to which the downlink data packet belongs, a subscriber accumulated usage level of the service to which the downlink data packet belongs, a subscriber level of the service to which the downlink data packet belongs, and a type of a UE receiving the downlink data packet. For example, the PCRF may pre-configure an FPI subscription table. As shown in the following Table 1, after receiving a service detection result reported by the PCEF, the PCRF queries, according to the service type corresponding to the downlink data packet, the subscriber accumulated usage level, whether the service is subscribed to, and the subscriber level, Table 1 to obtain the corresponding FPI. A person skilled in the art should know that Table 1 is merely for exemplary description, and specific content may be adjusted according to actual applications, which is not limited in the embodiment of the present invention.

TABLE 1

| Service Type | Subscriber Accumulated Usage Level | Whether a service is subscribed to | Subscriber Level | FPI |
| --- | --- | --- | --- | --- |
| Video | Low | Yes | High | 1 |
| Video | Low | No | High | 2 |
| Video | High | No | Intermediate | 3 |
| Web page browsing | Low | No | Intermediate | 4 |

TABLE 1-continued

| Service Type | Subscriber Accumulated Usage Level | Whether a service is subscribed to | Subscriber Level | FPI |
|---|---|---|---|---|
| Web page browsing | High | No | Intermediate | 5 |

For another example, the PCRF may also calculate, through a certain specific formula, the FPI according to at least one of the following items: the service priority of the service to which the downlink data packet belongs, the subscriber accumulated usage level of the service to which the downlink data packet belongs, the subscriber level of the service to which the downlink data packet belongs, and the type of the UE receiving the downlink data packet.

The foregoing parameters related to the downlink data packet, such as the service priority of the service to which the downlink data packet belongs, the subscriber accumulated usage level of the service to which the downlink data packet belongs, the subscriber level of the service to which the downlink data packet belongs, and the type of the UE receiving the downlink data packet, are merely exemplary examples. In actual applications, other parameters of quality of service may be adopted, which are not limited in the embodiment of the present invention.

303b: The PCRF sends the FPI corresponding to the downlink data packet to the PCEF.

Exemplarily, the PCRF may deliver, through a Gx interface to the PCEF, a policy and charging control (Policy and Charging Control PCC) rule, including the FPI corresponding to the downlink data packet, for example, the PCRF carries the FPI corresponding to the downlink data packet in a Charging-Rule-Install information element of a CC-Answer message.

303c: The RCRF generates a PCC rule.

The PCC rule includes at least one of the following items: a service priority of a service to which the downlink data packet belongs, a subscriber accumulated usage level of the service to which the downlink data packet belongs, a subscriber level of the service to which the downlink data packet belongs, and a type of a UE receiving the downlink data packet.

303d: The PCRF delivers the PCC rule to the PCEF.

Exemplarily, the PCRF delivers, through a Gx interface, the PCC rule to the PCEF, for example, the PCRF may carries service priority information in a Charging-Rule-Install information element of a CC-Answer message.

303e: The PCEF obtains an FPI corresponding to the downlink data packet.

Exemplarily, the PCEF may obtain the corresponding FPI according to a service type of the service to which the downlink data packet belongs and at least one of the following items: the service priority of the service to which the downlink data packet belongs, the subscriber accumulated usage level of the service to which the downlink data packet belongs, the subscriber level of the service to which the downlink data packet belongs, and the type of the UE receiving the downlink data packet. For example, the PCEF may also obtain the corresponding FPI by configuring an FPI subscription table. Reference may be made to the content in 303a for details, which are not repeatedly described here.

304: The PCEF carries the obtained FPI in the downlink data packet.

Exemplarily, the PCEF may carry the FPI in the downlink data packet by marking a user plane data packet. For example, the FPI may be carried in a tunnel encapsulation header or in an IP packet header of the downlink data packet. The following exemplary description does not constitute a limitation to the embodiment of the present invention.

1) Carry the FPI in the tunnel encapsulation header.

For a GPRS tunneling protocol (GPRS Tunneling Protocol, GTP) interface, such as Gn/Gp, S5/S8, and Iu interfaces, the FPI may be carried by adopting a GTP-U header extension manner. As shown in Table 2 and Table 3, a type of an extension header is 00, so as not to affect another network element.

TABLE 2

| | Bits | | | | | | | |
|---|---|---|---|---|---|---|---|---|
| Octets | 8 | 7 | 6 | 5 | 4 | 3 | 2 | 1 |
| 1 | Version | | | PT | (*) | E | S | PN |
| 2 | Message Type | | | | | | | |
| 3 | Length ($1^{st}$ Octet) | | | | | | | |
| 4 | Length ($2^{nd}$ Octet) | | | | | | | |
| 5 | Tunnel Endpoint Identifier ($1^{st}$ Octet) | | | | | | | |
| 6 | Tunnel Endpoint Identifier ($2^{nd}$ Octet) | | | | | | | |
| 7 | Tunnel Endpoint Identifier ($3^{rd}$ Octet) | | | | | | | |
| 8 | Tunnel Endpoint Identifier ($4^{th}$ Octet) | | | | | | | |
| 9 | Sequence Number ($1^{st}$ Octet)[1) 4)] | | | | | | | |
| 10 | Sequence Number (2nd Octet)1) 4) | | | | | | | |
| 11 | N-PDU Number2) 4) | | | | | | | |
| 12 | Next Extension Header Type3) 4) | | | | | | | |

TABLE 3

| Next Extension Header Field Value | Type of Extension Header |
|---|---|
| 0000 0000 | No more extension headers |
| 0000 0001 | MBMS support indication |
| 0000 0010 | MS Info Change Reporting support indication |
| 0010 0000 | Service Flow Priority Identifier(new) |
| 1100 0000 | PDCP PDU number |
| 1100 0001 | Suspend Request |
| 1100 0010 | Suspend Response |

For a proxy mobile IP version 6 (PMIPv6) interface, such as S2a and S2b, the FPI may be carried by adding a field in generic routing encapsulation (Generic Routing Encapsulation, GRE), and the FPI may also be carried by using a Reserved0 or Reserved1 cell in existing GRE encapsulation, as shown in Table 4.

TABLE 4

| 0 | 1 | 2 | 3 | 4 5 6 7 8 9 0 1 2 3 4 | 5 6 7 8 9 0 1 2 | 3 4 5 6 7 8 9 0 1 |
|---|---|---|---|---|---|---|
| C | K | S | Reserved0 | Ver | Protocol Type | |
| Checksum (optional) | | | | | Reserved1 (Optional) | |
| Key (optional) | | | | | | |
| Sequence Number (Optional) | | | | | | |

2) If the FPI is carried in the IP packet header, it is unnecessary to extend tunnel encapsulation.

For example, for an IPv4 packet, a differentiated services code point (Differentiated Services Code Point, DSCP) field may be adopted to identify an FPI, as shown in Table 5. In this embodiment, merely a DSCP in an IP header at an application layer within a tunnel carries the FPI, which does not affect scheduling of an intermediate node and is also not affected by rewriting of a DSCP in an IP header at an external layer of the tunnel by the intermediate node.

TABLE 5

| 0 1 2 3 4 5 6 7 8 9 0 1 2 3 4 5 | 6 | 7 | 8 | 9 | 0 | 1 | 2 | 3 | 4 | 5 | 6 | 7 | 8 | 9 | 0 | 1 |
|---|---|---|---|---|---|---|---|---|---|---|---|---|---|---|---|---|
| Version IHL DSCP | | | | | | Total Length | | | | | | | | | | |
| Identification | | | Flags | | | | | | Fragment Offset | | | | | | | |
| Time to Live Protocol | | | | | | Header Checksum | | | | | | | | | | |
| Source Address | | | | | | | | | | | | | | | | |
| Destination Address | | | | | | | | | | | | | | | | |
| Options | | | | | | | | | | Padding | | | | | | |

Figure 6:
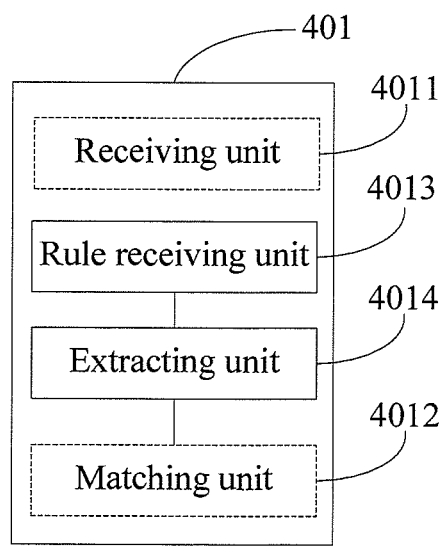
FIG. 6 is a schematic structural diagram of the obtaining unit of the policy and charging enforcement function entity according to the embodiment of the present invention.

For another example, for an IPv6 packet, a FPI may be carried by adopting a Traffic Class field, as shown in FIG. 6.

TABLE 6

| 0 1 2 3 4 5 6 7 8 9 0 1 2 3 4 5 | 6 | 7 | 8 | 9 | 0 | 1 | 2 | 3 | 4 | 5 | 6 | 7 | 8 | 9 | 0 | 1 |
|---|---|---|---|---|---|---|---|---|---|---|---|---|---|---|---|---|
| Version Traffic Class | | | | | | Flow Label | | | | | | | | | | |
| Payload Length | | | Next Header | | | | | | | Hop Limit | | | | | | |
| Source Address | | | | | | | | | | | | | | | | |
| Destination Address | | | | | | | | | | | | | | | | |

It should be noted that the foregoing manners for carrying the FPI are merely several common instances, to which specific applications are not limited, and the details are not described in detail here.

305: The PCEF sends the downlink data packet to a base station.

Optionally, the PCEF may send the downlink data packet according to the FPI of the downlink data packet. Exemplarily, the PCEF may prioritize and schedule downlink data packets based on FPIs, and preferentially send a downlink data packet of a service flow with a high priority.

Optionally, when the downlink data packet passes through the intermediate node, the intermediate node may also forward the downlink data packet according to the FPI of the downlink data packet. Exemplarily, the intermediate node may prioritize and schedule downlink data packets based on FPIs, and preferentially send a downlink data packet of a service flow with a high priority.

306: The base station sends the downlink data packet to the UE according to the FPI of the downlink data packet.

In this embodiment, sending of the downlink data packet based on the FPI may be implemented in multiple manners, and this embodiment is merely described in the following manners, to which this embodiment is not limited. For example, the downlink data packet may be sent to the UE according to a sequence of service flow priorities indicated by FPIs, and the downlink data packet may also be sent to the UE according to weight information corresponding to the FPI, or the downlink data packet may be sent to the UE according to weight information corresponding to the FPI and weight information corresponding to a bearer to which the downlink data packet belongs.

That the downlink data packet is sent according to the weight information corresponding to the FPI and the weight information of the bearer corresponding to the downlink data packet is taken as an example for description in the following.

For example, as shown in Table 7, a certain cell has three subscribers, each subscriber has a bearer with a weight of 100, 50, and 50; each bear has three queues with a weight of 60, 30, and 10, and each queue may correspond to two different FPIs. When there is a downlink data packet passing, the downlink data packet may be inserted to a corresponding queue according to a bearer to which the downlink data packet belongs and an FPI of the downlink data packet. When a base station sends a downlink data packet, the base station first allocates scheduling opportunities (2:1:1) to bearers according to weights of the bearers. After the bearers are scheduled, the base station allocates scheduling opportunities (6:3:1) to queues according to weights of the queues of the bearers, so as to choose and send a downlink data packet in a corresponding queue. Based on this, a downlink data packet of a service flow with a high priority may be sent preferentially, and a downlink data packet of a service flow with a low priority may be sent after a delay. In this manner, end-to-end control of quality of service based on service flow granularity is implemented, end-to-end differentiated processing can be performed on the service flow, differentiated service experiences can be provided for different levels of subscribers and different types of services, and utilization efficiency of radio resources may be effectively improved.

TABLE 7

| Subscriber | Quality of Service Class Identifier | FPI | Bearer Weight | Queue Weight | Examples of Services |
|---|---|---|---|---|---|
| A | 7 | 1~2 | 100 | 60 | Services that may be controlled by operators, such as videos and multimedia messages |
| | | 3~4 | | 30 | Services with a high priority, such as instant messages and web page browsing |
| | | 5~6 | | 10 | Services with a low priority, such as point-to-point transmission |

TABLE 7-continued

| Subscriber | Quality of Service Class Identifier | FPI | Bearer Weight | Queue Weight | Examples of Services |
|---|---|---|---|---|---|
| B | 8 | 1~2 | 50 | 60 | Services that may be controlled by operators, such as videos and multimedia messages |
|   |   | 3~4 |   | 30 | Services with a high priority, such as instant messages and web page browsing |
|   |   | 5~6 |   | 10 | Services with a low priority, such as point-to-point transmission |
| C | 8 | 1~2 | 50 | 60 | Services that may be controlled by operators, such as videos and multimedia messages |
|   |   | 3~4 |   | 30 | Services with a high priority, such as instant messages and web page browsing |
|   |   | 5~6 |   | 10 | Services with a low priority, such as point-to-point transmission |

It should be noted that, for a working mechanism for the PCEF and the intermediate node to send the downlink data packet according to the FPI, reference may be made to a working mechanism for the base station to send the downlink data packet according to the FPI, and details are not repeatedly described here.

In the method for controlling quality of service provided in this embodiment, a priority of a service flow is indicated by using a one-dimensional scalar FPI, a downlink data packet including the FPI is sent to a base station through a policy and charging enforcement function entity, and then the base station sends the downlink data packet of the service flow according to the FPI; in this way, end-to-end control of quality of service based on service flow granularity is implemented, end-to-end differentiated processing can be performed on the service flow, differentiated service experiences can be provided for different levels of subscribers and different types of services, and utilization efficiency of radio resources can be effectively improved.

Figure 4:
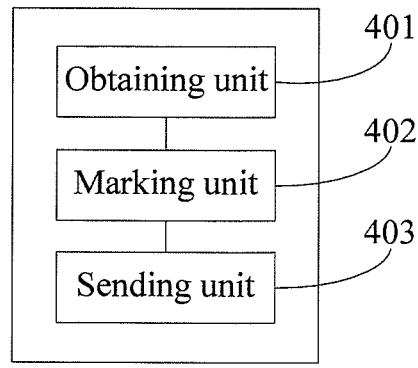
FIG. 4 is a schematic structural diagram of a policy and charging enforcement function entity according to an embodiment of the present invention.

Based on a same idea, still another embodiment of the present invention provides a policy and charging enforcement function entity. As shown in FIG. 4, the policy and charging enforcement function entity includes an obtaining unit 401, a marking unit 402, and a sending unit 403, where the obtaining unit 401 is configured to obtain an FPI of a downlink data packet;

the marking unit 402 is configured to carry the FPI in the downlink data packet; and the sending unit 403 is configured to send the downlink data packet to a base station, so that the base station sends the downlink data packet to a UE according to the FPI.

Figure 5:
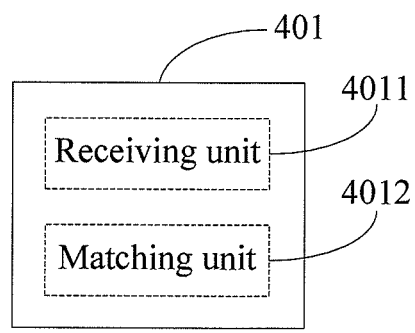
FIG. 5 is a schematic structural diagram of an obtaining unit of the policy and charging enforcement function entity according to the embodiment of the present invention.

Furthermore, as shown in FIG. 5, the obtaining unit 401 includes a receiving unit 4011 or a matching unit 4012. The receiving unit 4011 is configured to receive an FPI sent by a PCRF, where the FPI is obtained by the PCRF according to a service type of a service to which the downlink data packet belongs and at least one of the following items: a service priority of the service to which the downlink data packet belongs, a subscriber accumulated usage level of the service to which the downlink data packet belongs, a subscriber level of the service to which the downlink data packet belongs, and a type of the UE receiving the downlink data packet. The matching unit 4012 is configured to obtain the FPI according to a service type of a service to which the downlink data packet belongs and at least one of the following items: a service priority of the service to which the downlink data packet belongs, a subscriber accumulated usage level of the service to which the downlink data packet belongs, a subscriber level of the service to which the downlink data packet belongs, and a type of the UE receiving the downlink data packet.

Furthermore, as shown in FIG. 6, the obtaining unit 401 further includes a rule receiving unit 4013 and an extracting unit 4014. The rule receiving unit 4013 is configured to receive a policy and charging control PCC rule delivered by the PCRF. The extracting unit 4014 is configured to obtain, from the PCC rule, at least one of the following items: the service priority of the service to which the downlink data packet belongs, the subscriber accumulated usage level of the service to which the downlink data packet belongs, the subscriber level of the service to which the downlink data packet belongs, and the type of the UE receiving the downlink data packet.

Figure 7:
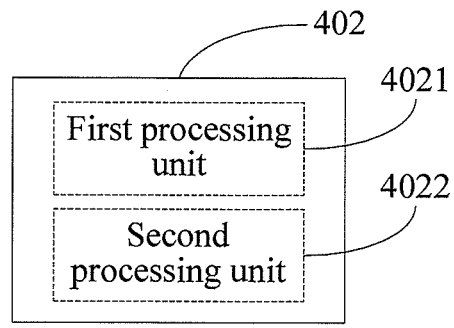
FIG. 7 is a schematic structural diagram of a marking unit of the policy and charging enforcement function entity according to the embodiment of the present invention.

Furthermore, as shown in FIG. 7, the marking unit 402 includes a first processing unit 4021 or a second processing unit 4022. The first processing unit 4021 is configured to carry the FPI in a tunnel encapsulation header of the downlink data packet; and the second processing unit 4022 is configured to carry the FPI in an IP packet header of the downlink data packet.

Furthermore, the sending unit 403 is specifically configured to send, through an intermediate node, the downlink data packet to a base station, so that the base station sends the downlink data packet to the UE according to the FPI, where the downlink data packet is sent by the intermediate node to the base station according to the FPI.

A working mechanism for the policy and charging enforcement function entity provided in this embodiment to implement the method for controlling quality of service is the same as a working mechanism in the embodiments shown in FIG. 1 and FIG. 3, and details are not repeatedly described here. The policy and charging enforcement function entity shown in FIG. 1 and FIG. 3 may be implemented by the policy and charging enforcement function entity provided in this embodiment.

In the policy and charging enforcement function entity provided in this embodiment, a priority of a service flow is indicated by using a one-dimensional scalar FPI, and a downlink data packet carrying the FPI is sent to a base station, so that the base station sends the downlink data packet of the service flow according to the FPI; in this way, end-to-end control of quality of service based on service flow granularity is implemented, end-to-end differentiated processing can be performed on the service flow, differentiated service experiences can be provided for different levels of subscribers and different types of services, and utilization efficiency of radio resources can be effectively improved.

Figure 8:
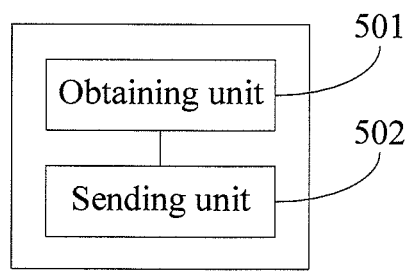
FIG. 8 is a schematic structural diagram of a policy and charging rules function entity according to an embodiment of the present invention.

Based on a same idea, yet another embodiment of the present invention provides a policy and charging rules function entity. As shown in FIG. 8, the policy and charging rules function entity includes an obtaining unit 501 and a sending unit 502, where the obtaining unit 501 is configured to obtain an FPI according to a service type of a service to which a downlink data packet belongs and at least one of the following items: a service priority of the service to which the downlink data packet belongs, a subscriber accumulated usage level of the service to which the downlink data packet belongs, a subscriber level of the service to which the downlink data packet belongs, and a type of a UE receiving the downlink data packet; and the sending unit 502 is configured to send the FPI to a policy and charging enforcement function entity.

The policy and charging rules function entity provided in the embodiment of the present invention may implement the policy and charging rules function entity in the embodiments shown in FIG. 1 and FIG. 3.

In the policy and charging rules function entity provided in the embodiment of the present invention, a priority of a service flow is indicated by using a one-dimensional scalar FPI, and the FPI is sent to a policy and charging enforcement function entity; in this way, end-to-end control of quality of service based on service flow granularity can be implemented, end-to-end differentiated processing can be performed on the service flow, differentiated service experiences can be provided for different levels of subscribers and different types of services, and utilization efficiency of radio resources can be effectively improved.

Figure 9:
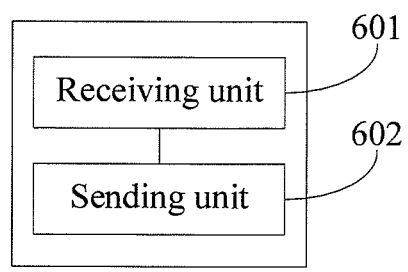
FIG. 9 is a schematic structural diagram of a base station according to an embodiment of the present invention.

Based on a same idea, yet another embodiment of the present invention provides a base station. As shown in FIG. 9, the base station includes a receiving unit 601 and a sending unit 602, where the receiving unit 601 is configured to receive a downlink data packet, where the downlink data packet includes an FPI; and the sending unit 602 is configured to send the downlink data packet to a UE according to the FPI.

Figure 10:
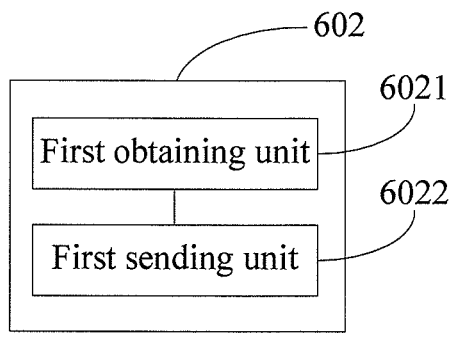
FIG. 10 is a schematic structural diagram of a sending unit of the base station according to the embodiment of the present invention.

Furthermore, as shown in FIG. 10, the sending unit 602 includes a first obtaining unit 6021 and a first sending unit 6022. The first obtaining unit 6021 is configured to obtain weight information corresponding to the FPI; and the first sending unit 6022 is configured to send the downlink data packet to the UE according to the weight information corresponding to the FPI.

Figure 11:
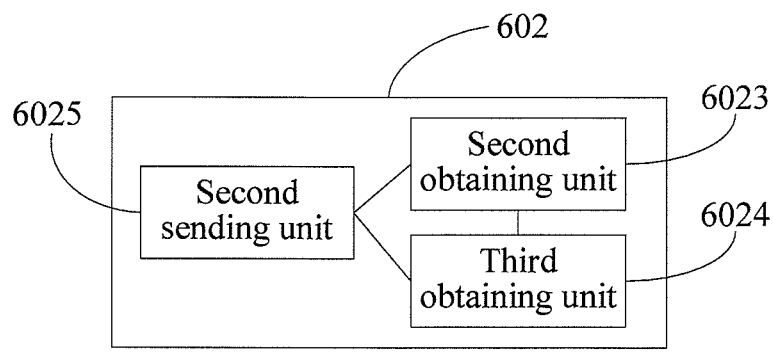
FIG. 11 is a schematic structural diagram of a sending unit of another base station according to the embodiment of the present invention.

Furthermore, as shown in FIG. 11, the sending unit 602 includes a second obtaining unit 6023, a third obtaining unit 6024, and a second sending unit 6025. The second obtaining unit 6023 is configured to obtain weight information corresponding to the FPI; the third obtaining unit 6024 is configured to obtain weight information corresponding to a bearer of the downlink data packet; and the second sending unit 6025 is configured to send the downlink data packet to the UE according to the weight information corresponding to the FPI and the weight information corresponding to the bearer to which the downlink data packet belongs.

A working mechanism for the base station provided in the embodiment of the present invention to implement control of quality of service is the same as that in the embodiments shown in FIG. 2 and FIG. 3, and details are not repeatedly described here. The base station in FIG. 2 and FIG. 3 may be implemented by the base station provided in this embodiment.

In the base station provided in the embodiment of the present invention, a priority of a service flow is indicated by using a one-dimensional scalar FPI, and sending of a downlink data packet of the service flow is performed according to the FPI through a base station; in this way, end-to-end control of quality of service based on service flow granularity is implemented, end-to-end differentiated processing can be performed on the service flow, differentiated service experiences can be provided for different levels of subscribers and different types of services, and utilization efficiency of radio resources can be effectively improved.

Figure 12:
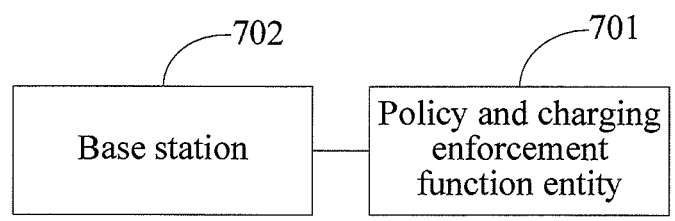
FIG. 12 is a schematic structural diagram of a system for controlling quality of service according to an embodiment of the present invention.

Based on a same idea, yet another embodiment of the present invention provides a system for controlling quality of service. As shown in FIG. 12, the system for controlling quality of service includes a policy and charging enforcement function entity 701 and a base station 702, where:

the policy and charging enforcement function entity 701 may be the policy and charging enforcement function entity shown in FIG. 4; and the base station 702 may be the base station shown in FIG. 9.

A working mechanism for the system for controlling quality of service provided in this embodiment to implement control of quality of service is the same as working mechanism(s) in the embodiments shown in FIG. 1 to FIG. 3, and details are not repeatedly described here.

In the system for controlling quality of service provided in this embodiment, a priority of a service flow is indicated by using a one-dimensional scalar FPI, a downlink data packet including the FPI is sent to a base station through a policy and charging enforcement function entity, and then the base station sends the downlink data packet of the service flow according to the FPI; in this way, end-to-end control of quality of service based on service flow granularity is implemented, end-to-end differentiated processing can be performed on the service flow, differentiated service experiences can be provided for different levels of subscribers and different types of services, and utilization efficiency of radio resources can be effectively improved.

It should be noted that, a person skilled in the art may easily understand that the device for implementing control of quality of service described in the foregoing embodiments may also exist as part of another system, and the method for implementing control of quality of service in the system is consistent with that described in the foregoing embodiments. Therefore, the another system including the device for implementing control of quality of service provided in the foregoing embodiments should also fall within the protection scope of the application, and details are not repeatedly described here.

A person skilled in the art may further be aware that, units and algorithm steps of each example described in combination with the embodiments disclosed here may be implemented by electronic hardware, computer software, or a combination of the two. In order to clearly describe interchangeability between the hardware and the software, compositions and steps of each example have been generally described according to functions in the foregoing description. Whether the functions are executed by hardware or software depends on particular applications and design constraint conditions of the technical solutions. A person skilled in the art may use different methods to implement the described functions for each specific application. However, it should not be considered that this implementation goes beyond the scope of the embodiments of the present invention.

The methods or algorithm steps described in combination with the embodiments disclosed here may be directly implemented by using hardware, a software module executed by a processor, or a combination of the two. The software module may be located in a random access memory (RAM), a memory, a read only memory (ROM), an electrically programmable ROM, an electrically erasable programmable ROM, a register, a hard disk, a removable disk, a CD-ROM, or any storage medium that is in another form and is well-known in the art.

The foregoing description of the disclosed embodiments enables a person skilled in the art to implement or use the embodiments of the present invention. Multiple kinds of modifications to the embodiments are obvious to a person skilled in the art, and general principles defined here may be implemented in other embodiments without departing from the spirit or scope of the embodiments of the present invention. Therefore, the embodiments of the present invention are not limited to the embodiments described here but fall within the broadest scope in line with the principle and novel features disclosed here.

The foregoing description is merely exemplary embodiments of the embodiments of the present invention, but is not intended to limit the embodiments of the present invention. Any modification, equivalent replacement, or improvement made within the spirit and principles of the embodiments of the present invention shall fall within the protection scope of the embodiments of the present invention.

What is claimed is:

1. A method for controlling quality of service, the method comprising:
   obtaining, by a policy and charging enforcement function (PCEF) entity, a service flow priority identifier (FPI) of a downlink data packet, wherein the FPI is used to indicate a priority of a service flow to which the downlink data packet belongs;
   adding, by the PCEF entity, the FPI into the downlink data packet; and
   sending, by the PCEF entity, the downlink data packet to a base station, so that the base station obtains weight information corresponding to the FPI, obtains weight information corresponding to a bearer to which the downlink data packet belongs, and sends the downlink data packet to a user equipment (UE) according to the FPI, the weight information corresponding to the FPI, and the weight information corresponding to the bearer to which the downlink data packet belongs.

2. The method according to claim 1, wherein obtaining, by the PCEF entity, the FPI of the downlink data packet comprises:
   obtaining, by the PCEF entity, the FPI according to a service type of a service to which the downlink data packet belongs and at least one of the following items: a service priority of the service to which the downlink data packet belongs, a subscriber accumulated usage level of the service to which the downlink data packet belongs, a subscriber level of the service to which the downlink data packet belongs, and a type of the UE receiving the downlink data packet; or
   receiving, by the PCEF entity, an FPI sent by a policy and charging rules function (PCRF) entity, wherein the FPI is obtained by the PCRF entity according to a service type of a service to which the downlink data packet belongs and at least one of the following items: a service priority of the service to which the downlink data packet belongs, a subscriber accumulated usage level of the service to which the downlink data packet belongs, a subscriber level of the service to which the downlink data packet belongs, and a type of the UE receiving the downlink data packet.

3. The method according to claim 2, wherein before obtaining, by the PCEF entity, the FPI according to the service type of the service to which the downlink data packet belongs, the method further comprises:
   receiving, by the PCEF entity, a policy and charging control (PCC) rule delivered by the PCRF entity; and
   obtaining, by the PCEF entity from the PPC rule, at least one of the following items: the service priority of the service to which the downlink data packet belongs, the subscriber accumulated usage level of the service to which the downlink data packet belongs, the subscriber level of the service to which the downlink data packet belongs, and the type of the UE receiving the downlink data packet.

4. The method according to claim 1, wherein adding, by the PCEF entity, the FPI in the downlink data packet comprises:
   adding, by the PCEF entity, the FPI into a tunnel encapsulation header of the downlink data packet; or
   adding, by the PCEF entity, the FPI into an IP packet header of the downlink data packet.

5. The method according to claim 1, wherein sending, by the PCEF entity, the downlink data packet to the base station, so that the base station sends the data packet to the UE according to the FPI comprises:
   sending, by the PCEF entity, the downlink data packet to the base station through an intermediate node, so that the base station sends the downlink data packet to the UE according to the FPI, wherein the downlink data packet is sent by the intermediate node to the base station according to the FPI.

6. A method for controlling quality of service, the method comprising:
   receiving, by a base station, a downlink data packet, wherein the downlink data packet comprises a service flow priority identifier (FPI), and the FPI is used to indicate a priority of a service flow to which the downlink data packet belongs;
   obtaining, by the base station, weight information corresponding to the FPI; and
   obtaining, by the base station, weight information corresponding to a bearer to which the downlink data packet belongs; and
   sending, by the base station, the downlink data packet to a user equipment (UE) according to the FPI, the weight information corresponding to the FPI and the weight information corresponding to a bearer to which the downlink data packet belongs.

7. The method the according to claim 6, wherein the FPI is obtained according to a service type of a service to which the downlink data packet belongs and at least one of the following items: a service priority of the service to which the downlink data packet belongs, a subscriber accumulated usage level of the service to which the downlink data packet belongs, a subscriber level of the service to which the downlink data packet belongs, and a type of the UE receiving the downlink data packet.

8. The method according to claim 6, further comprising:
   obtaining, by the base station, the weight information corresponding to the FPI; and
   obtaining, by the base station, the weight information corresponding to a bearer to which the downlink data packet belongs.

9. A policy and charging enforcement function entity, comprising:
   a memory storage comprising instructions; and
   one or more processors in communication with the memory, wherein the one or more processors execute the instructions to:
   obtain a service flow priority identifier (FPI) of a downlink data packet, wherein the FPI is used to indicate a priority of a service flow to which the downlink data packet belongs;
   carry the FPI in the downlink data packet; and
   send the downlink data packet to a base station, so that the base station obtains weight information corresponding to the FPI, obtains weight information corresponding to a bearer to which the downlink data packet belongs, and sends the downlink data packet to a user equipment (UE) according to the FPI, the weight information corresponding to the FPI, and the weight information corresponding to a bearer to which the downlink data packet belongs.

10. The policy and charging enforcement function entity according to claim 9, wherein:
the one or more processors further execute the instructions to:
obtain the FPI according to a service type of a service to which the downlink data packet belongs and at least one of the following items: a service priority of the service to which the downlink data packet belongs, a subscriber accumulated usage level of the service to which the downlink data packet belongs, a subscriber level of the service to which the downlink data packet belongs, and a type of the UE receiving the downlink data packet; or
receive an FPI sent by a policy and charging rules function (PCRF) entity, wherein the FPI is obtained by the PCRF entity according to a service type of a service to which the downlink data packet belongs and at least one of the following items: a service priority of the service to which the downlink data packet belongs, a subscriber accumulated usage level of the service to which the downlink data packet belongs, a subscriber level of the service to which the downlink data packet belongs, and a type of the UE receiving the downlink data packet.

11. The policy and charging enforcement function entity according to claim 10, wherein:
the one or more processors further execute the instructions to:
receive a policy and charging control (PCC) rule delivered by the PCRF entity; and
obtain, from the PCC rule, at least one of the following items: the service priority of the service to which the downlink data packet belongs, the subscriber accumulated usage level of the service to which the downlink data packet belongs, the subscriber level of the service to which the downlink data packet belongs, and the type of the UE receiving the downlink data packet.

12. The policy and charging enforcement function entity according to claim 9, wherein the one or more processors further execute the instructions to: send the downlink data packet to the base station through an intermediate node, so that the base station sends the downlink data packet to the UE according to the FPI, wherein the downlink data packet is sent by the intermediate node to the base station according to the FPI.

13. A policy and charging enforcement function entity, comprising:
a memory storage comprising instructions; and
one or more processors in communication with the memory, wherein the one or more processors execute the instructions to:
obtain a service flow priority identifier (FPI) of a downlink data packet, wherein the FPI is used to indicate a priority of a service flow to which the downlink data packet belongs;
carry the FPI in the downlink data packet; and
send the downlink data packet to a base station, so that the base station sends the downlink data packet to a user equipment (UE) according to the FPI and weight information corresponding to a bearer to which the downlink data packet belongs,
wherein the one or more processors comprise a first processing unit and a second processing unit;
the first processing unit is configured to carry the FPI in a tunnel encapsulation header of the downlink data packet; and
the second processing unit is configured to carry the FPI in an IP packet header of the downlink data packet.

14. A base station, comprising:
a memory storage comprising instructions; and
one or more processors in communication with the memory, wherein the one or more processors execute the instructions to:
receive a downlink data packet, wherein the downlink data packet comprises a service flow priority identifier (FPI), and the FPI is used to indicate a priority of a service flow to which the downlink data packet belongs;
obtain weight information corresponding to the FPI;
obtain weight information corresponding to a bearer to which the downlink data packet belongs; and
send the downlink data packet to a user equipment (UE) according to the FPI, the weight information corresponding to the FPI, and the weight information corresponding to the bearer to which the downlink data packet belongs.

* * * * *